US012604791B2

(12) United States Patent
Vandike et al.

(10) Patent No.: US 12,604,791 B2
(45) Date of Patent: Apr. 21, 2026

(54) MACHINE CONTROL BASED UPON ESTIMATED OPERATOR SKILL LEVEL TREND

(71) Applicant: Deere & Company, Moline, IL (US)

(72) Inventors: Nathan R. Vandike, Geneseo, IL (US); Bhanu Kiran Reddy Palla, Bettendorf, IA (US)

(73) Assignee: Deere & Company, Moline, IL (US)

( * ) Notice: Subject to any disclaimer, the term of this patent is extended or adjusted under 35 U.S.C. 154(b) by 512 days.

(21) Appl. No.: 17/858,481

(22) Filed: Jul. 6, 2022

(65) Prior Publication Data

US 2024/0008387 A1     Jan. 11, 2024

(51) Int. Cl.
| | |
|---|---|
| *A01B 79/00* | (2006.01) |
| *B60W 10/04* | (2006.01) |
| *B60W 10/20* | (2006.01) |
| *B60W 10/30* | (2006.01) |
| *B60W 50/08* | (2020.01) |
| *B60W 50/14* | (2020.01) |

(52) U.S. Cl.
CPC ........... *A01B 79/005* (2013.01); *B60W 10/04* (2013.01); *B60W 10/20* (2013.01); *B60W 10/30* (2013.01); *B60W 50/085* (2013.01); *B60W 50/14* (2013.01); *B60W 2300/15* (2013.01); *B60W 2540/30* (2013.01)

(58) Field of Classification Search
CPC ...... A01B 79/005; A01B 69/00; B60W 10/04; B60W 10/20; B60W 10/30; B60W 50/085; B60W 50/14; B60W 2300/15; B60W 2540/30; B60W 50/0097

USPC .............................................................. 701/6
See application file for complete search history.

(56) References Cited

U.S. PATENT DOCUMENTS

| | | | |
|---|---|---|---|
| 6,037,901 | A | 3/2000 | Devier et al. |
| 6,128,574 | A | 10/2000 | Diekhans |
| 6,216,071 | B1 | 4/2001 | Motz |
| 6,327,569 | B1 | 12/2001 | Reep |
| 6,360,179 | B1 | 3/2002 | Reep |
| 6,587,772 | B2 | 7/2003 | Behnke |
| 6,687,616 | B1 | 2/2004 | Peterson et al. |
| 7,155,888 | B2 | 1/2007 | Diekhans |
| 7,261,632 | B2 | 8/2007 | Pirro et al. |
| 7,539,570 | B2 | 5/2009 | Normann |
| 7,555,283 | B2 | 6/2009 | Fitzner et al. |
| 7,562,167 | B2 | 7/2009 | Anderson |
| 7,725,233 | B2 | 5/2010 | Hendrickson et al. |
| 7,756,624 | B2 | 7/2010 | Diekhans et al. |
| 8,060,283 | B2 | 11/2011 | Mott et al. |

(Continued)

FOREIGN PATENT DOCUMENTS

| | | |
|---|---|---|
| CA | 3081383 A1 | 5/2019 |
| CN | 103181263 A | 7/2013 |

(Continued)

*Primary Examiner* — Vivek D Koppikar
*Assistant Examiner* — Jeffrey R Chalhoub
(74) *Attorney, Agent, or Firm* — Christopher J. Volkmann; KELLY, HOLT & CHRISTENSON PLLC

(57)     ABSTRACT

Parameter values are detected for parameters that are indicative of an operator skill level. An operator skill level trend is generated, indicative of how the skill level of the operator changes over a future interval. A machine control signal is generated based upon the operator skill level trend.

20 Claims, 5 Drawing Sheets

(56) References Cited

U.S. PATENT DOCUMENTS

| | | | |
|---|---|---|---|
| 8,145,393 B2 | 3/2012 | Foster et al. | |
| 8,254,351 B2 | 8/2012 | Fitzner et al. | |
| 8,280,595 B2 | 10/2012 | Foster et al. | |
| 8,437,901 B2 | 5/2013 | Anderson | |
| 8,606,454 B2 | 12/2013 | Wang et al. | |
| 8,626,406 B2 | 1/2014 | Schleicher et al. | |
| 8,639,408 B2 | 1/2014 | Anderson | |
| 8,652,041 B2 | 2/2014 | Moore-Ede | |
| 8,738,238 B2 | 5/2014 | Rekow | |
| 8,781,692 B2 | 7/2014 | Kormann | |
| 8,868,304 B2 | 10/2014 | Bonefas | |
| 8,942,860 B2 | 1/2015 | Morselli | |
| 9,014,901 B2 | 4/2015 | Wang et al. | |
| 9,188,986 B2 | 11/2015 | Baumann | |
| 9,326,444 B2 | 5/2016 | Bonefas | |
| 9,392,746 B2 | 7/2016 | Darr et al. | |
| 9,464,410 B2 * | 10/2016 | Johnson | E02F 3/434 |
| 9,523,180 B2 | 12/2016 | Deines | |
| 9,529,364 B2 | 12/2016 | Foster et al. | |
| 9,605,583 B2 | 3/2017 | Goering et al. | |
| 9,642,305 B2 | 5/2017 | Nykamp et al. | |
| 9,675,008 B1 | 6/2017 | Rusciolelli et al. | |
| 9,772,625 B2 | 9/2017 | Gilmore et al. | |
| 9,992,931 B2 | 6/2018 | Bonefas et al. | |
| 9,992,932 B2 | 6/2018 | Bonefas et al. | |
| 10,015,928 B2 | 7/2018 | Nykamp et al. | |
| 10,064,335 B2 | 9/2018 | Byttebier et al. | |
| 10,126,282 B2 | 11/2018 | Anderson et al. | |
| 10,129,528 B2 | 11/2018 | Bonefas et al. | |
| 10,317,272 B2 | 6/2019 | Bhavsar et al. | |
| 10,398,084 B2 | 9/2019 | Ray et al. | |
| 10,537,061 B2 | 1/2020 | Farley et al. | |
| 10,677,637 B1 | 6/2020 | Von Muenster | |
| 10,780,946 B2 | 9/2020 | Meier et al. | |
| 10,809,118 B1 | 10/2020 | Von Muenster | |
| 10,830,634 B2 | 11/2020 | Blank et al. | |
| 10,890,922 B2 | 1/2021 | Ramm et al. | |
| 10,966,071 B2 | 3/2021 | Suleman et al. | |
| 11,008,177 B2 * | 5/2021 | Banthia | B60P 1/40 |
| 11,112,262 B2 | 9/2021 | Anderson | |
| 11,620,603 B2 * | 4/2023 | Nagel | G05D 1/0022 |
| | | | 705/7.39 |
| 2002/0083695 A1 | 7/2002 | Behnke et al. | |
| 2004/0116169 A1 | 6/2004 | Isfort et al. | |
| 2005/0279070 A1 | 12/2005 | Pirro et al. | |
| 2005/0284119 A1 | 12/2005 | Brunner | |
| 2006/0047418 A1 | 3/2006 | Metzler et al. | |
| 2006/0094487 A1 | 5/2006 | Huster et al. | |
| 2007/0037621 A1 | 2/2007 | Isfort | |
| 2007/0089390 A1 | 4/2007 | Hendrickson et al. | |
| 2008/0245042 A1 | 10/2008 | Brunnert et al. | |
| 2009/0044505 A1 | 2/2009 | Huster et al. | |
| 2009/0306835 A1 | 12/2009 | Ellermann et al. | |
| 2010/0070145 A1 | 3/2010 | Foster et al. | |
| 2010/0332051 A1 | 12/2010 | Kormann | |
| 2011/0022273 A1 | 1/2011 | Peters et al. | |
| 2011/0061762 A1 | 3/2011 | Madsen et al. | |
| 2011/0066337 A1 | 3/2011 | Kormann | |
| 2011/0160961 A1 | 6/2011 | Wollenhaupt et al. | |
| 2011/0205084 A1 | 8/2011 | Morselli et al. | |
| 2011/0224873 A1 | 9/2011 | Reeve et al. | |
| 2012/0029732 A1 | 2/2012 | Meyer | |
| 2012/0085458 A1 | 4/2012 | Wenzel | |
| 2012/0087771 A1 | 4/2012 | Wenzel | |
| 2012/0215394 A1 | 8/2012 | Wang et al. | |
| 2012/0215409 A1 | 8/2012 | Wang et al. | |
| 2012/0263560 A1 | 10/2012 | Diekhans et al. | |
| 2012/0265412 A1 | 10/2012 | Diekhans et al. | |
| 2012/0293316 A1 * | 11/2012 | Johnson | E02F 9/2087 |
| | | | 340/438 |
| 2012/0302299 A1 | 11/2012 | Behnke et al. | |
| 2013/0019580 A1 | 1/2013 | Anderson et al. | |
| 2013/0022430 A1 | 1/2013 | Anderson et al. | |
| 2013/0211675 A1 | 8/2013 | Bonefas | |
| 2013/0213518 A1 | 8/2013 | Bonefas | |

| | | | |
|---|---|---|---|
| 2013/0227922 A1 | 9/2013 | Zametzer et al. | |
| 2014/0121882 A1 | 5/2014 | Gilmore et al. | |
| 2014/0224377 A1 | 8/2014 | Bonefas | |
| 2014/0311113 A1 | 10/2014 | Bonefas | |
| 2014/0324272 A1 | 10/2014 | Madsen et al. | |
| 2015/0094944 A1 | 4/2015 | Baumann | |
| 2015/0189832 A1 | 7/2015 | Krause et al. | |
| 2015/0327425 A1 | 11/2015 | Dillon | |
| 2015/0327440 A1 * | 11/2015 | Dybro | A01D 75/00 |
| | | | 73/862.541 |
| 2016/0061643 A1 | 3/2016 | Wilson et al. | |
| 2016/0183463 A1 | 6/2016 | Herman et al. | |
| 2016/0252384 A1 | 9/2016 | Wilson et al. | |
| 2016/0270294 A1 | 9/2016 | Viaene et al. | |
| 2017/0042088 A1 | 2/2017 | Nykamp et al. | |
| 2017/0049053 A1 | 2/2017 | Bonefas et al. | |
| 2017/0055446 A1 * | 3/2017 | Nykamp | A01D 43/087 |
| 2017/0086378 A1 | 3/2017 | Lisouski et al. | |
| 2017/0206645 A1 | 7/2017 | Bonefas et al. | |
| 2017/0245435 A1 | 8/2017 | Rusciolelli et al. | |
| 2017/0276534 A1 | 9/2017 | Vermue et al. | |
| 2018/0022559 A1 | 1/2018 | Knutson | |
| 2018/0037424 A1 | 2/2018 | Green et al. | |
| 2019/0261560 A1 | 8/2019 | Jelenkovic | |
| 2019/0351765 A1 | 11/2019 | Rabusic | |
| 2019/0364734 A1 | 12/2019 | Kriebel et al. | |
| 2020/0048866 A1 * | 2/2020 | Weber | E02F 9/205 |
| 2020/0064144 A1 | 2/2020 | Tomita et al. | |
| 2020/0064863 A1 | 2/2020 | Tomita et al. | |
| 2020/0090094 A1 | 3/2020 | Blank | |
| 2020/0128734 A1 | 4/2020 | Brammeier et al. | |
| 2020/0128737 A1 | 4/2020 | Anderson et al. | |
| 2020/0128738 A1 | 4/2020 | Suleman et al. | |
| 2020/0128740 A1 | 4/2020 | Suleman | |
| 2020/0133262 A1 | 4/2020 | Suleman et al. | |
| 2020/0137957 A1 | 5/2020 | Friesen | |
| 2020/0187409 A1 | 6/2020 | Meyer zu Helligen | |
| 2020/0196526 A1 | 6/2020 | Koch et al. | |
| 2020/0317114 A1 | 10/2020 | Hoff | |
| 2020/0319632 A1 | 10/2020 | Desai et al. | |
| 2020/0319655 A1 | 10/2020 | Desai et al. | |
| 2020/0352099 A1 | 11/2020 | Meier et al. | |
| 2020/0359547 A1 | 11/2020 | Sakaguchi et al. | |
| 2020/0359549 A1 | 11/2020 | Sakaguchi et al. | |
| 2020/0375083 A1 | 12/2020 | Anderson et al. | |
| 2020/0375084 A1 | 12/2020 | Sakaguchi et al. | |
| 2020/0378088 A1 | 12/2020 | Anderson | |
| 2020/0404842 A1 | 12/2020 | Dugas et al. | |
| 2021/0015041 A1 | 1/2021 | Bormann et al. | |
| 2021/0026362 A1 | 1/2021 | Wilson et al. | |
| 2021/0029877 A1 | 2/2021 | Vandike et al. | |
| 2021/0099522 A1 | 4/2021 | Chiocco et al. | |
| 2021/0294337 A1 | 9/2021 | Van Mill et al. | |
| 2021/0333802 A1 | 10/2021 | Singh et al. | |
| 2021/0337729 A1 | 11/2021 | O'Connor et al. | |
| 2021/0339729 A1 | 11/2021 | O'Connor et al. | |
| 2022/0015288 A1 | 1/2022 | Christiansen et al. | |
| 2022/0019238 A1 | 1/2022 | Christiansen et al. | |
| 2022/0019239 A1 | 1/2022 | Christiansen et al. | |
| 2022/0019240 A1 | 1/2022 | Christiansen et al. | |
| 2022/0019241 A1 | 1/2022 | Christiansen et al. | |
| 2022/0039318 A1 | 2/2022 | Raste et al. | |
| 2022/0095539 A1 | 3/2022 | Faust et al. | |
| 2022/0110238 A1 | 4/2022 | Vandike et al. | |
| 2022/0110246 A1 * | 4/2022 | Vandike | A01D 41/1278 |
| 2022/0110253 A1 | 4/2022 | Anderson et al. | |
| 2022/0110262 A1 | 4/2022 | Vandike et al. | |
| 2022/0113727 A1 | 4/2022 | Vandike et al. | |
| 2022/0117143 A1 | 4/2022 | Kraus et al. | |
| 2022/0122197 A1 | 4/2022 | Hanrieder | |
| 2022/0132736 A1 | 5/2022 | Meyers et al. | |
| 2022/0132737 A1 | 5/2022 | Anderson et al. | |
| 2022/0176818 A1 | 6/2022 | Piscopo et al. | |
| 2022/0197302 A1 * | 6/2022 | McClelland | A01D 41/1278 |
| 2022/0204051 A1 | 6/2022 | Rands et al. | |
| 2022/0204052 A1 | 6/2022 | Creaby et al. | |
| 2022/0206512 A1 | 6/2022 | Rands et al. | |
| 2022/0207852 A1 | 6/2022 | Sharma et al. | |
| 2022/0225568 A1 | 7/2022 | Toniges et al. | |

(56) References Cited

U.S. PATENT DOCUMENTS

| | | | |
|---|---|---|---|
| 2022/0232763 A1 | 7/2022 | Reddy Palla et al. | |
| 2022/0232770 A1 | 7/2022 | Yanke et al. | |
| 2022/0256770 A1 | 8/2022 | Faust et al. | |
| 2022/0304227 A1 | 9/2022 | Hill et al. | |
| 2022/0304231 A1 | 9/2022 | Faust et al. | |
| 2022/0374026 A1 | 11/2022 | Vougioukas et al. | |
| 2022/0382277 A1 | 12/2022 | Nishii et al. | |
| 2022/0408645 A1 | 12/2022 | O'Connor et al. | |
| 2022/0410704 A1 | 12/2022 | O'Connor et al. | |
| 2023/0027697 A1 | 1/2023 | Rush | |
| 2023/0031013 A1 | 2/2023 | Faust et al. | |
| 2023/0035890 A1 | 2/2023 | McKinney et al. | |
| 2023/0041687 A1* | 2/2023 | Kormann | A01F 25/183 |

FOREIGN PATENT DOCUMENTS

| | | |
|---|---|---|
| CN | 102725776 | 9/2015 |
| CN | 111201879 A | 5/2020 |
| CN | 111406505 A | 7/2020 |
| CN | 114846991 A | 8/2022 |
| CN | 114915637 A | 8/2022 |
| CN | 115067061 A | 9/2022 |
| CN | 115280960 A | 11/2022 |
| CN | 115643895 A | 1/2023 |
| DE | 102009041646 A1 | 3/2011 |
| DE | 102010004648 A1 | 7/2011 |
| DE | 202012103730 U1 | 10/2012 |
| DE | 102012211001 A1 | 1/2014 |
| DE | 102013012027 A1 | 1/2015 |
| DE | 102011005400 84 | 5/2015 |
| DE | 102015109799 A1 | 12/2016 |
| DE | 102017204511 A1 | 9/2018 |
| DE | 102011062688 B4 | 2/2021 |
| DE | 102020124508 A1 | 3/2022 |
| EP | 1219153 A2 | 7/2002 |
| EP | 1219159 A1 | 7/2002 |
| EP | 1674324 A1 | 6/2006 |
| EP | 1609349 B1 | 5/2008 |
| EP | 2057884 A1 | 5/2009 |
| EP | 1731983 B1 | 9/2009 |
| EP | 2174537 A1 | 4/2010 |
| EP | 2186389 A1 | 5/2010 |
| EP | 2301318 B1 | 11/2011 |
| EP | 2146307 B1 | 5/2012 |
| EP | 2508057 A1 | 10/2012 |
| EP | 2621258 A1 | 8/2013 |
| EP | 2786325 A1 | 10/2014 |
| EP | 2829171 A2 | 1/2015 |
| EP | 2462551 81 | 5/2017 |
| EP | 2995191 B1 | 10/2017 |
| EP | 3315006 A1 | 5/2018 |
| EP | 3315007 A1 | 5/2018 |
| EP | 3316218 A1 | 5/2018 |
| EP | 3289853 B1 | 3/2019 |
| EP | 3289852 B1 | 6/2019 |
| EP | 3000307 B1 | 12/2019 |
| EP | 3593620 A1 | 1/2020 |
| EP | 3243374 B1 | 3/2020 |
| EP | 2812267 81 | 2/2021 |
| EP | 3847878 A1 | 7/2021 |
| EP | 3706544 B1 | 12/2021 |
| EP | 3970471 A1 | 3/2022 |
| EP | 3315005 B1 | 4/2022 |
| GB | 2517049 A | 2/2015 |
| IN | 202241032643 A | 6/2022 |
| JP | 2002186348 A | 7/2002 |
| JP | 2005102572 A | 4/2005 |
| JP | 2015084667 A | 5/2015 |
| JP | 2018068284 A | 5/2018 |
| JP | 2019004796 A | 1/2019 |
| JP | 2019216744 A | 12/2019 |
| JP | 2020127405 A | 8/2020 |
| JP | 2021069341 A | 5/2021 |
| JP | 2022141070 A | 9/2022 |
| RU | 2529905 C2 | 10/2014 |
| UA | 90246 C2 | 4/2010 |
| WO | 2012110544 A1 | 8/2012 |
| WO | 2013086351 A1 | 6/2013 |
| WO | WO2013087275 A1 | 6/2013 |
| WO | 2013120079 A1 | 8/2013 |
| WO | 2013141975 A2 | 9/2013 |
| WO | 2013151619 A2 | 10/2013 |
| WO | 2013162673 A2 | 10/2013 |
| WO | 2013184177 A2 | 12/2013 |
| WO | 2013184178 A2 | 12/2013 |
| WO | 2014046685 A1 | 3/2014 |
| WO | 2014116819 A1 | 7/2014 |
| WO | WO2018043336 A1 | 3/2018 |
| WO | WO2018112615 A1 | 6/2018 |
| WO | WO2018116772 A1 | 6/2018 |
| WO | 2018142768 A1 | 8/2018 |
| WO | 2018185522 A1 | 10/2018 |
| WO | 2018226139 A1 | 12/2018 |
| WO | VVO2019124273 A1 | 6/2019 |
| WO | WO2019124174 A1 | 6/2019 |
| WO | WO2019124217 A1 | 6/2019 |
| WO | WO2019124225 A1 | 6/2019 |
| WO | 2019215185 A1 | 11/2019 |
| WO | WO2020026578 A1 | 2/2020 |
| WO | WO2020026650 A1 | 2/2020 |
| WO | WO2020026651 A1 | 2/2020 |
| WO | WO2020031473 A1 | 2/2020 |
| WO | WO2020038810 A1 | 2/2020 |
| WO | WO2020039671 A1 | 2/2020 |
| WO | WO2020044726 A1 | 3/2020 |
| WO | WO202082182 A1 | 4/2020 |
| WO | WO2020100810 A1 | 5/2020 |
| WO | WVO2020110920 A1 | 6/2020 |
| WO | 2020206941 A1 | 10/2020 |
| WO | WO2020206942 A1 | 10/2020 |
| WO | WVO21049098 A1 | 3/2021 |
| WO | WO21246384 A1 | 12/2021 |
| WO | 2022118572 A1 | 6/2022 |
| WO | WO22130038 A1 | 6/2022 |
| WO | WO22130039 A1 | 6/2022 |
| WO | WO22268779 A2 | 12/2022 |

\* cited by examiner

MACHINE CONTROL BASED UPON ESTIMATED OPERATOR SKILL LEVEL TREND

FIELD OF THE DESCRIPTION

The present description relates to agricultural equipment. More specifically, the present description relates to estimating a trend of operator skill level and generating control signals based upon the trend.

BACKGROUND

There are a wide variety of different types of agricultural machines. Such machines can include planting machines (such as row unit planters, air seeders, etc.), tillage machines, harvesters (such as combine harvesters, cotton harvesters, forage harvesters, sugar cane harvesters, among others), etc. Such agricultural machines are often operated by an operator. The skill level of the operator often increases as the operator learns through instruction and gains experience through repeated performance of an operation or as the operator accumulates time operating a machine. Also, operator fatigue can adversely impact the performance of even an operator who has acquired advanced skill level. Thus, the skill level of a fatigued operator may be lower than the skill level of that same operator when the operator is not fatigued.

The discussion above is merely provided for general background information and is not intended to be used as an aid in determining the scope of the claimed subject matter.

SUMMARY

Parameter values are detected for parameters that are indicative of an operator skill level. An operator skill level trend is generated, indicative of how the skill level of the operator changes over a future interval. A machine control signal is generated based upon the operator skill level trend.

Example 1 is a computer implemented method of controlling an agricultural machine, comprising:

detecting a skill-based parameter value indicative of an operator skill level in controlling the agricultural machine to perform an agricultural operation;

generating an operator skill level trend indicative of estimated variation in the operator skill level over a future portion of the agricultural operation based on the skill-based parameter value; and generating a control signal to control a controllable subsystem of the agricultural machine based on the operator skill level trend.

Example 2 is the computer implemented method of any or all previous examples, wherein generating an operator skill level trend comprises:

generating the operator skill level trend indicative of estimated variation in the operator skill level over a future time interval.

Example 3 is the computer implemented method of any or all previous examples, wherein generating an operator skill level trend comprises:

generating the operator skill level trend indicative of estimated variation in the operator skill level over a portion of a future machine path to be taken by the agricultural machine in performing the agricultural operation.

Example 4 is the computer implemented method of any or all previous examples, wherein generating an operator skill level trend comprises:

generating a current operator skill level;

generating an operator fatigue level; and generating the operator skill level trend based on the current operator skill level and the operator fatigue level.

Example 5 is the computer implemented method of any or all previous examples wherein generating a control signal comprises:

generating the control signal to control a path planning subsystem to control a path of the agricultural machine in performing the agricultural operation based on the operator skill level trend.

Example 6 is the computer implemented method of any or all previous examples, wherein generating the control signal to control the path planning subsystem comprises:

controlling the path planning subsystem so the path directs the agricultural machine over a portion of a field having characteristics indicative of a first difficulty in performing the agricultural operation when the operator skill level trend indicates that the operator skill level will be at a first level and so the path directs the agricultural machine over a portion of the field having characteristics indicative of a second difficulty in performing the agricultural operation when the operator skill level trend indicates that the operator skill level will be at a second level.

Example 7 is the computer implemented method of any or all previous examples, wherein generating a control signal comprises:

generating the control signal to control a propulsion subsystem to control propulsion of the agricultural machine in performing the agricultural operation based on the operator skill level trend.

Example 8 is the computer implemented method of any or all previous examples, wherein generating a control signal comprises:

generating the control signal to control a steering subsystem to control steering of the agricultural machine in performing the agricultural operation based on the operator skill level trend.

Example 9 is the computer implemented method of any or all previous examples, wherein generating a control signal comprises:

generating the control signal to control a material handling subsystem to control material handling of the agricultural machine based on the operator skill level trend.

Example 10 is the computer implemented method of any or all previous examples, wherein generating a control signal comprises:

generating the control signal to control an operator interface subsystem on the agricultural machine based on the operator skill level trend.

Example 11 is the computer implemented method of any or all previous examples and further comprising:

sending the operator skill level trend to a control system that is used for controlling another machine; and controlling the other agricultural machine based on the operator skill level trend.

Example 12 is an agricultural system, comprising:

at least one processor; and a data store that stores computer executable instructions that, when executed by the at least one processor, cause the at least one processor to perform steps, comprising:

detecting a skill-based parameter value indicative of an operator skill level in controlling a first agricultural machine to perform an agricultural operation;

generating an operator skill level trend indicative of estimated variation in the operator skill level over a future portion of the agricultural operation based on the skill-based parameter value; and generating a control signal to control a controllable subsystem of the first agricultural machine based on the operator skill level trend.

Example 13 is the agricultural system of any or all previous examples, wherein the computer executable instructions, when executed by the at least one processor cause the at least one processor to perform steps further comprising:

sending an indication of the operator skill level trend to a control system that is used for controlling a second agricultural machine; and controlling the second agricultural machine based on the indication of the operator skill level trend.

Example 14 is the agricultural system of any or all previous examples, wherein generating an operator skill level trend comprises:

generating the operator skill level trend indicative of estimated variation in the operator skill level over a future time interval.

Example 15 is the agricultural system of any or all previous examples, wherein generating an operator skill level trend comprises:

generating the operator skill level trend indicative of estimated variation in the operator skill level over a portion of a future machine path to be taken by the first agricultural machine in performing the operation.

Example 16 is the agricultural system of any or all previous examples, wherein generating an operator skill level trend comprises:

generating a current operator skill level based on the skill-based parameter value;

detecting a fatigue parameter value indicative of operator fatigue;

generating an operator fatigue level based on the fatigue parameter value; and generating the operator skill level trend based on the current operator skill level and the operator fatigue level.

Example 17 is an agricultural machine comprising:

a sensor detecting a skill-based parameter value indicative of an operator skill level in controlling the agricultural machine to perform an agricultural operation;

a future skill level trend generation component generating an operator skill level trend indicative of estimated variation in the operator skill level over a future portion of the agricultural operation based on the skill-based parameter value;

a controllable subsystem; and a control system generating a control signal to control the controllable subsystem of the agricultural machine based on the operator skill level trend.

Example 18 is the agricultural machine of any or all previous examples and further comprising:

a communication system configured to send an indication of the operator skill level trend to a control system used for controlling a second agricultural machine.

Example 19 is the agricultural machine of any or all previous examples, wherein the operator skill level trend comprises an operator skill level trend indicative of estimated variation in the operator skill level over a future time interval.

Example 20 is the agricultural machine of any or all previous examples, wherein the operator skill level trend comprises an operator skill level trend indicative of estimated variation in the operator skill level over a portion of a future machine path to be taken by the first agricultural machine in performing the agricultural operation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
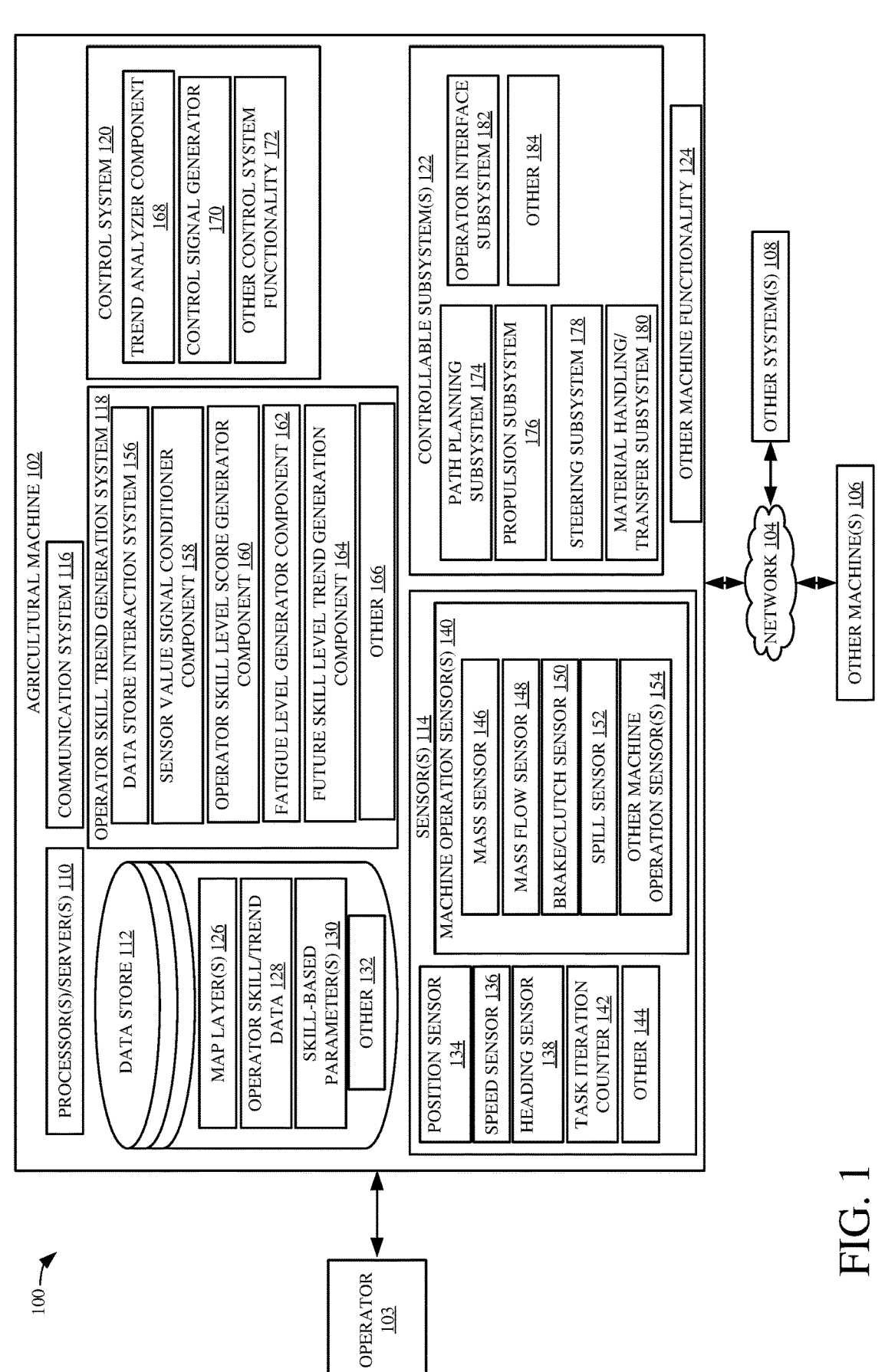
FIG. 1 is a block diagram of one example of an agricultural system.

As discussed above, the skill level of an operator can change over time and the skill level can also be adversely affected by operator fatigue. Some current systems attempt to detect an operator skill level and/or operator fatigue and limit operational characteristics of a machine based upon the operator skill level and/or the operator fatigue. However, such systems do not predict how the operator's skill level will change in the future and this can present problems.

For instance, assume that an operator's current skill level is a 5 on a scale of 1-10, with higher numbers indicating greater skill level. Assume further that the agricultural machine that the operator is operating is being controlled based on the operator's current skill level, without considering how the operator's skill level is likely to change in the future. However, assume also that, as the operator continues to operate the agricultural machine over the next six hours, the operator skill level will degrade due to fatigue. This can result in the operator performing sub-optimally.

By way of example, early on in a harvesting operation, the operator may be harvesting a relatively easy portion of the field to harvest. That portion of the field may be flat, have a generally uniform yield, the soil may have a moisture level that facilitates good machine traction, etc. However, later in the harvesting operation the operator may be operating the machine in a different part of the field that is more difficult to harvest. That portion of the field may have hills or other challenging terrain, higher soil moisture leading to less machine traction, areas of widely varying yield, etc. With current systems, even if the operator skill level is detected at the outset of the harvesting operation, the operator's skill level has degraded due to fatigue by the time the operator begins harvesting the more challenging portion of the field later in the harvesting operations.

Therefore, the present discussion proceeds with respect to a system that not only detects an operator's current skill level and fatigue level, but estimates a future trend in the operator's skill level and fatigue level. The future trend can indicate and can thus be used to identify an operator's skill level and/or fatigue level at a given location or at a given time, or both. A control signal is then generated to control the agricultural machine based upon that trend. This leads to improved machine control. In one example, assume that an operator is operating a harvester and the operator's skill level trend shows that at the beginning of the harvesting operation, the operator's skill level is at a 4, and over the course of the first several hours of harvesting, the operator's skill level increases to 6 as the operator becomes accustomed to the machine and the operation being performed. However, after that, fatigue sets in and the operator's skill level degrades back to a 3. In that case, a control signal can be generated to control a path planning subsystem so that the harvesting path that the operator takes through the field is such that the operator harvests the more challenging areas of the field at a time when the operator's skill level is at its peak. A control signal can also be generated to control the path of the harvester so the operator is harvesting the less challenging portions of the field when the operator's skill level is lowest, according to the operator skill level trend.

Also, in one example, the skill level trend for an operator of one agricultural machine can be shared with the control system of another agricultural machine. For instance, assume that an operator of a tractor pulling a grain cart has been operating the tractor for 12 hours consecutively, while the operator of a harvester has only been operating the harvester for 1 hour. In that case, the operator skill level trend for the operator of the tractor may degrade more quickly due to fatigue than the operator skill level trend for the operator of the harvester. Therefore, while the operator of the harvester may have a skill level that supports going at a first travel speed, it may be that the operator of the tractor has a skill level that only supports traveling at a second, lower, travel speed. In that case, the operator skill level trend of the operator of the tractor can be communicated to a control system on the harvester so that the harvester is speed limited to accommodate for the degradation in the skill level of the operator of the tractor, even though the skill level of the operator of the harvester would support a higher speed. In another example, the skill level trend for an operator of one agricultural machine can be shared with a remote system, such as a remote control system used for controlling one or more other machines. For instance, assume that an operator of a tractor pulling a grain cart has been operating the tractor for 12 hours consecutively, while a harvester is being operated by a remote control system. Therefore, while the desired harvest speed for the harvester may be at a first travel speed, it may be that the operator of the tractor has a skill level that only supports traveling at a second, lower, travel speed. In that case, the operator skill level trend of the operator of the tractor can be communicated to the remote control system used for controlling the harvester so that the harvester is speed limited to accommodate for the degradation in the skill level of the operator of the tractor.

FIG. 1 is a block diagram of one example of an agricultural system 100 in which an agricultural machine 102 is operated by operator 103 and is communicatively coupled over network 104 to one or more other machines 106 and/or other systems 108. In the example discussed herein, agricultural machine 102 will be described as a combine harvester. However, it could just as easily be a forage harvester, a bailer, a cotton harvester, a sugar cane harvester, a receiving vehicle (such as a tractor pulling a grain cart or a grain truck), any of a wide variety of different types of planting machines, such as row unit planters or air seeders or tillage or other agricultural machines. Other machines 106 can also be any of the agricultural machines discussed above. Other systems 108 can be other computing systems, such as a farm manager computing system, a vendor or manufacturer computing system, or any of a wide variety of other systems, such as one or more remote control systems used for controlling one or more other machines 106.

Network 104 can be a wide area network, a local area network, a near field communication network, a Bluetooth network, a Wi-Fi network, a cellular network, or any of a wide variety of other networks or combinations of networks.

In the example shown in FIG. 1, agricultural machine 102 includes processors or servers 110, data store 112, sensors 114, communication system 116, operator skill trend generation system 118, control system 120, controllable subsystems 122, and other machine functionality 124. Data store 112 can store map layers 126, operator skill/trend data 128, skill-based parameters 130, and other items 132. Sensors 114 can include position sensor 134, speed sensor 136, heading sensor 138, machine operation sensors 140, task iteration counter 142, and other sensors 144. Machine operation sensors 140 can include mass sensor 146, mass flow sensor 148, brake/clutch sensor 150, spill sensor 152, and other machine operation sensors 154. Operator skill trend generation system 118 includes data store interaction system 156, sensor value signal conditioner component 158, operator skill level score generator component 160, fatigue level generator component 162, future skill level trend generation component 164, and other items 166. Control system 120 can include trend analyzer component 168, control signal generator 170, and other control system functionality 172. Controllable subsystems 122 can include path planning subsystem 174, propulsion subsystem 176, steering subsystem 178, material handling/transfer subsystem 180, operator interface subsystem 182, and other subsystems 184.

Prior to describing the operation of agricultural system 100 in more detail, a description of some of the items in agricultural system 100, and their operation, will first provided. An operator's skill level may be represented by a numeric score, an alphanumeric indicator, a category (e.g., low, medium, high), a color (e.g., (e.g., red, yellow, green) or in a variety of other ways. An operator's skill level trend illustratively identifies how the operator's skill level will vary over time, over a geographic area (such as over the field being harvested), and/or under different operating conditions. For instance, at the beginning of a shift, the operator's skill level may be high under all operating conditions. After an hour of operation, the operator's skill level may increase. However, after six hours of operation, the operator's skill level on relatively flat terrain (or unchallenging terrain) may still be high, but the operator's skill level on hilly or muddy terrain (or otherwise more challenging terrain) may be lower. These are just examples of how the operator skill level may vary over time according to an operator skill level trend.

Map layers 126 in data store 112 can include maps of any of a wide variety of conditions, characteristics, or values, or combinations of conditions, characteristics, or values, mapped to different geographic locations on a field. For instance, the map layers 126 may be terrain maps that indicate the slope and direction of slope of terrain, soil characteristic maps such as moisture maps that map moisture levels to different locations in the field, crop characteristic maps such as crop state maps that map crop state (direction and magnitude of leaning) or yield maps that map estimated yield to different locations in the field or various other crop characteristic maps, or any of a wide variety of other maps. Operator skill/trend data 128 may include operator-specific skill level trends that have been previously calculated for a given operator. The skill level trends may be correlated to different machines and for different operations and for different conditions so that a single operator may have a different skill level trend for each different machine, for each different type of operation (harvesting, planting, tillage, etc.), and/or for different conditions. The operator skill/trend data 128 may also indicate how fatigue will affect the operator's skill level over time or under certain conditions (such as during the day time or night time hours, under certain operating conditions such as muddy conditions, hilly conditions, flat conditions, lighting conditions, weather conditions, temperatures, etc.). Skill-based parameters 130 illustratively identify the parameters that the system 100 will consider in identifying an operator's skill level and skill level trend.

The skill-based parameters 130 may vary based upon the type of operation or the type of agricultural machine being operated. For instance, on a harvester, the skill-based parameters 130 to be monitored in order to identify an operator skill level may be different from the skill-based parameters 130 that are monitored when the operator is driving a tractor that is pulling a grain cart. The skill-based parameters 130 may be different still, depending on the type of header that is on a harvester, depending on type of crop being harvested, or depending upon the conditions under which a harvesting operation is taking place. Further, the skill-based parameters 130 that are used to identify an operator skill level may be different for tillage machines than those for a planting machine. The skill-based parameters 130 may be indexed in data store 112 by machine, by agricultural operation, or in other ways so that the appropriate skill-based parameters 130 can be quickly retrieved from data store 112 and used to identify an operator skill level.

Sensors 114 may generate sensor values that are indicative of the values of the skill-based parameters 130. The values may also be indicative of other sensed items as well. Position sensor 134 identifies the geographic position of agricultural machine 102 within a global or local coordinate system. Therefore, position sensor 134 can be a global navigation satellite system (GNSS) receiver and corresponding circuitry, a dead reckoning sensor and corresponding circuitry, a cellular triangulation system, or any of a wide variety of other sensors and circuitry that can generate an output indicative of the geographic position of agricultural machine 102.

Speed sensor 136 generates an output signal indicative of the ground speed of agricultural machine 102. Speed sensor 136 may thus be a sensor that senses the speed of rotation of an axle or ground engaging elements (such as wheels or tracks) of machine 102 or the speed of a transmission. Speed sensor 136 may derive the speed of agricultural machine 102 based on other inputs as well. For instance, speed sensor 136 may receive the position signal output by position sensor 134 and calculate the change in position of agricultural machine 102 over time to derive the speed of agricultural machine 102. Speed sensor 136 can be a RADAR sensor, or any of a variety of other sensors that can be used to sense the speed of agricultural machine 102. Speed sensor 136 can also be used to determine the acceleration and deceleration of agricultural machine 102. If the operator is aggressively accelerating or decelerating, this may be indicative of the skill level of the operator. Further, if the speed of agricultural machine 102 is relatively consistent, this may indicate that the skill level of the operator is higher than when the speed of agricultural machine 102 is highly variable.

Heading sensor 138 senses the heading or orientation of agricultural machine 102. Therefore, heading sensor 138 can be a compass, an inertial measurement unit, a gyroscopic sensor, or a sensor that determines the heading of agricultural machine 102 based upon the output of other sensors. For instance, heading sensor 138 can receive the position signal output by position sensor 134 and determine the direction of travel of agricultural machine 102 based upon the change in position of agricultural machine 102.

Task iteration counter 142 detects when agricultural machine 102 has performed an iteration of a particular operation and increments a counter value. For instance, the task may be a harvesting pass through a field. In that case, when the agricultural machine 102 makes a turn at the end of a pass, this may be sensed by task iteration counter 142 or otherwise detected by task iteration counter 142 to indicate that a pass has been completed so that the task iteration counter will be incremented. If the task is an unloading operation, then task iteration counter 142 may detect when an unloading auger begins to run and when the unloading auger stops running, or may detect the level in the grain tank of an agricultural machine 102, or other parameters indicative of when an unloading operation begins and ends. Task iteration counter 142 can increment a counter value for that task as well. These are just two examples of tasks that can be counted. The number of tasks that are performed by a particular operator 103 can be used in determining the skill level of that operator 103. For instance, as the operator gains experience, the operator's skill level may increase. However, the number of task iterations can also be used in calculating the operator's fatigue so that, after a certain number of task iterations, the operator 103 may be fatigued and the skill level of the operator 103 may thus degrade.

Machine operation sensors 140 sense the state or characteristics of different machine operations. Some of the machine operations may be those operations that are controlled based upon the operator skill level trend. For instance, mass sensor 146 may sense the mass of harvested material in agricultural machine 102. If the agricultural machine 102 is a harvester, or a grain cart, or a planter, the mass can be measured or the fill level of material in the grain tank or gain cart or the air cart or row unit tanks can be used to estimate mass. The mass that is permitted to be carried by agricultural machine 102 may be limited based upon the skill level of the operator 103. For instance, operators with higher skill level may be able to operate machine 102 effectively with higher loads even in difficult conditions (such as muddy conditions). However, inexperienced operators may not be able to operate the machine as well when the machine is carrying a heavier load. Therefore, based upon the operator's skill level trend, the mass carried by the machine may be limited.

Mass flow sensor 148 may sense a mass flow of material that is being handled by agricultural machine 102. For instance, if agricultural machine 102 is a harvester, then the mass flow of material through agricultural machine 102 can be sensed. The mass flow may also be limited based upon the operator's skill level trend. By way of example, a highly skilled operator may be able to operate a harvester in high yield conditions better than an operator that has a lower skill level. Therefore, when the agricultural machine 102 is approaching a high yield area of the field, the forward speed of the agricultural machine 102 may be limited based upon the operator skill level and the operator skill level trend so the mass flow of material through the machine is limited. Similarly, if the operator skill level trend shows that the operator skill level will decrease over time, then agricultural machine 102 can be controlled to harvest the higher yield areas (which will result in higher mass flow through the machine) at the beginning of the operator's shift and harvest the lower yield portions of the field toward the end of the operator's shift. These are just examples of how the mass flow of material through agricultural machine 102, sensed by mass flow sensor 148, can be controlled based upon the operator skill level trend.

Brake/clutch sensor 150 is illustratively a sensor that senses operator actuation of the break and/or clutch on agricultural machine 102. By way of example, the frequency and aggressiveness with which the operator actuates the break and/or clutch may be indicative of the operator's skill level.

Spill sensor 152 senses the spillage of harvested material from agricultural machine 102. For instance, when agricultural machine 102 is a harvester, the harvester may have an unloading spout with a camera attached. Image processing circuitry can identify when material exiting the unloading spout is deposited in a receiving vehicle, and when the material is spilled on the ground. The frequency and amount of spillage may be indicative of the operator skill level as well.

Settings sensors 153 sense various settings of subsystems of the agricultural machine 102. For example, settings sensors 153 may include sensors that detect the engine speed setting, sensors that detect the transmission settings, such as the settings for an infinitely variable transmission (IVT), sensors that detect the gear selection, as well as various other sensors that detect various other settings. The selected settings may indicate the operator skill level.

Other machine operation sensors 154 can be used to detect other machine operations. For instance, other machine operation sensors 154 may be used to sense whether operations are conducted consistently or are highly variable. For instance, if agricultural machine 102 is a planting machine, then operator 103 may set and adjust the downforce applied by the agricultural machine 102. The frequency with which operator 103 adjusts the applied downforce may be indicative of the skill level of the operator 103. In another example, the frequency with which operator 103 adjusts the heading (e.g., makes a course correction) of agricultural machine 102 may be indicative of the skill level of the operator.

Communication system 116 facilitates communication among the various items on agricultural machine 102 and with other machines 106 and other systems 108 over network 104. Therefore, communication system 116 may include a controller area network (CAN) bus and bus controller as well as other communication functionality that is used to communicate over network 104. Depending on the type of network 104, the functionality and communication system 116 may change.

Operator skill trend generation system 118 generates an output indicative of the predicted or estimated trend (or historical trend) of the skill level of operator 103. The trend can also be indicative of the predicted or estimate skill level of the operator 103 at a given time or a given location. Data store interaction system 156 interacts with data store 112 to obtain information from data store 112 and to store information in data store 112. For instance, depending on the type of agricultural machine 102, data store interaction system 156 can obtain the skill-based parameters 130 that will be monitored to generate an operator's skill level trend for operator 103. Data store interaction system 156 can also obtain map layers 126 and historical operator skill/trend data 128 for operator 103 relative to agricultural machine 102 or relative to other agricultural machines 106.

Sensor value signal conditioner component 158 receives sensor signals or other input signals indicative of the values of the skill-based parameters 130 that are used to calculate the operator skill level trend. Sensor value signal conditioner component 158 can receive and condition sensor signals. For instance, the sensor signals can be amplified, filtered, linearized, normalized, aggregated, or processed or conditioned in other ways.

Operator skill level score generator component 160 generates a current operator skill level score based upon the sensor signals and other inputs received by sensor value signal conditioner component 158. The particular algorithm used by operator skill level score generator component 160 can be any of a variety of different algorithms. For instance, the operator skill level can be generated using an artificial network, a Bayesian classifier, a model, or any of a wide variety of other algorithms or logic that receives as an output the skill-based parameters as inputs and generates an operator skill level score. The operator skill level score may be represented as a numerical or alphanumeric score, as a category (such as high, medium, low), or in other ways.

Fatigue level generation component 162 also receives inputs from sensor value signal conditioner component 158, and may receive other inputs, and generates an output indicative of the current fatigue level of operator 103. The fatigue level can be represented in the same way as the current operator's skill level or in a different way.

Future skill level trend generation component 164 receives the current operator skill level from operator skill level score generator component 160 and the current operator's fatigue level from fatigue level generator component 162. Future skill level trend generation component 164 can also receive other inputs, such as map layers 126 that identify the terrain to be encountered by agriculture machine 102 at different locations in the field, the estimated yield to be encountered by agriculture machine 102 at different locations in the field, the soil characteristics to be encountered by agricultural machine 102 at different locations in the field, the historical operator skill level trend data 128, and/or other inputs, and generates an operator skill level trend indicating how the operator skill level will vary in the future, accounting for the fatigue that will be encountered by the operator 103, and accounting for the conditions under which operator 103 will be controlling agricultural machine 102. By way of example, if operator 103 will be controlling agricultural machine 102 under particularly challenging conditions, this may increase the fatigue level of the operator and thus degrade the skill level of the operator more quickly than if the operator will be operating agricultural machine 102 over relatively simple conditions.

The operator skill level trend can be output in a number of different ways. The operator skill level trend can be output as a curve or as a table, showing the variation (e.g., change in value) of the operator skill level over time. Thus, the trend can indicate the operator skill level at a given time. The operator skill level trend can be output as a correlation between operator skill level scores and geographic location in the field. For instance, the operator skill level trend can be displayed over a representation of a portion of the field. The display can show values indicating what the operator's skill level will be at different locations in the field, when the agricultural machine 102 reaches that location. The operator skill level trend can be output in other ways as well.

Once the operator skill level trend is output by operator skill level trend generation system 118, communication system 116 can communicate the operator skill level trend to other machines 106 and other systems 108. Similarly, data store interaction system 156 can store the operator skill level trend in data store 112. The operator skill level trend can then be used to control machine 102, to control other machines 106, or used in other ways.

As an example, assume that agricultural machine 102 is a tractor pulling a grain cart and the operator skill level trend shows that, over the next hour, the skill level of operator 103 will degrade significantly, due to fatigue. In that case, the operator skill level trend may be communicated to another machine 106 which is a harvester. Thus, even though the operator of the harvester may be highly skilled and may be able to travel at a first speed, this may not be true of the operator of the tractor. Instead, because the operator skill level of operator 103 (the driver of a tractor pulling a grain cart alongside of the harvester) is degrading, the maximum speed of the harvester 106 may be limited to account for the degrading skill level of operator 103. This is just one example of how the operation of a second machine can be controlled based upon the operator's skill level trend of an operator of a first machine.

Control system 120 receives the operator skill level trend output by operator skill level trend generation system 118 and generates control signals to control one or more controllable subsystems 122 based upon the operator skill level trend. Trend analyzer component 168 receives the operator skill level trend output by operator skill trend generator system 118 to determine what type of control signals are to be generated. Trend analyzer component 168 can receive the map layers 126 indicative of field conditions, crop conditions, or other items in the geographic locations of the field that are to be encountered by agricultural machine 102 in the future. Trend analyzer component 168 can also receive timing indicators, such as the time at which the machine will reach a given location, the time at which the operator's skill or fatigue will reach a given level, the time at which certain conditions will be present. In some examples, the time indicators can be based off the current location of the machine, the heading or route of the machine, the speed of the machine, the current time, as well as various other inputs. Trend analyzer component 168 can also analyze the operator skill level trends received for operators of other machines 106, to determine whether those operator skill level trends have a bearing on how agricultural machine 102 should be controlled. Trend analyzer component 168 can be a state machine that receives the operator skill level trend, the map layers and other inputs and generates a state output indicating how the state of agricultural machine 102 should be changed in the future. Trend analyzer component 168 can be an artificial neural network, a machine learned algorithm, a feed forward control system, a linear control system, or any of a wide variety of other functionality that receives the operator skill level trend as an input and generates an output indicative of how agricultural machine 102 is to be controlled based upon the operator skill level trend.

Control signal generator 170 generates control signals based upon the output from trend analyzer component 168. The control signals generated by control signal generator 170 are applied to one or more of the controllable subsystems 122 in order to control agricultural machine based upon the operator skill level trend.

By way of example, the control signals can control path planning system 174 to ensure that agricultural machine 102 is passing over the most challenging terrain and is encountering the most challenging crop conditions and field conditions when the skill level of operator 103 is at its highest. Similarly, path planning subsystem 174 can be controlled so that agricultural machine 102 avoids the more difficult field conditions and terrain when the skill level of operator 103 is at its lowest. The control signals can control propulsion subsystem 176 to limit the maximum speed or acceleration of agricultural machine 102 based upon the operator skill level trend. For instance, as the skill level of operator 103 increases, propulsion subsystem 176 can be controlled to increase the maximum speed of agricultural machine 102 in correlation to the increase in operator skill level. As the skill level of operator 103 decreases (based upon the operator skill level trend), then propulsion system 176 can be controlled to decrease the maximum speed and/or maximum acceleration of agricultural machine 102.

Steering subsystem 178 can also be controlled based upon the operator skill level trend. The steering subsystem 178 can be controlled based upon the output (e.g., route or path) of path planning subsystem 174 so that agricultural machine 102 can be steered away from more difficult field conditions or steered toward those conditions based upon the operator skill level trend.

Material handling/transfer subsystem 180 can also be controlled based upon the operator skill level trend. For instance, if operator 103 is operating a tractor that is pulling a grain cart, then the material handling/transfer subsystem 180 can be controlled so that the maximum mass of material transferred to the grain cart from a harvester does not exceed a value that may be set based upon the operator skill level trend for operator 103. Similarly, when operator 103 is operating a harvester, then the material handling/transfer subsystem 180 may be controlled to unload more quickly or more often so that the overall mass or load carried by the harvester does not exceed a threshold value that is set based upon the operator skill level trend.

Operator interface subsystem 182 can also be controlled based upon the operator skill level trend. The operator interface subsystem 182 can include operator interface mechanisms that can receive inputs from operator 103 and generate outputs to operator 103. The inputs may be received using a joystick, steering wheel, pedals, knobs, linkages, levers, etc. The inputs can also be received by actuating a user actuatable display element on a computer system display. The user actuatable display elements may be icons, links, buttons, menus, etc. The user actuatable display mechanisms can be actuated using a point and click device, using a touch gesture where touch screen control is provided, or using voice commands where speech recognition is provided. The operator interface subsystem 182 can be used to generate an audio, visual, or haptic output indicative of the operator skill level trend, or indicative of how agricultural machine 102 is being controlled based upon the operator skill level trend.

Figure 2A:
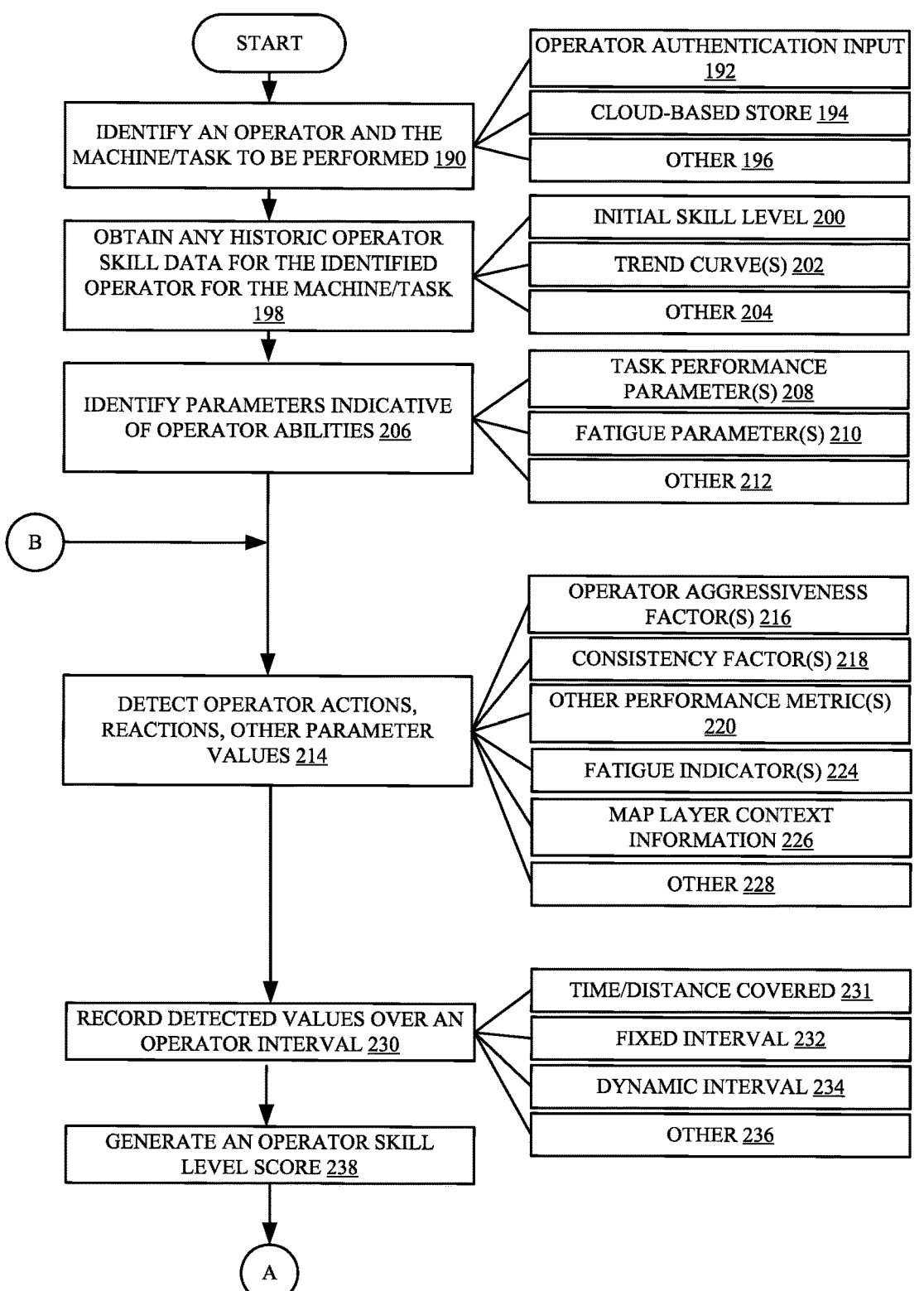
FIGS. 2A and 2B (collectively referred to herein as FIG. 2) is a flow diagram illustrating one example of the operation of the agricultural system.
Figure 2B:
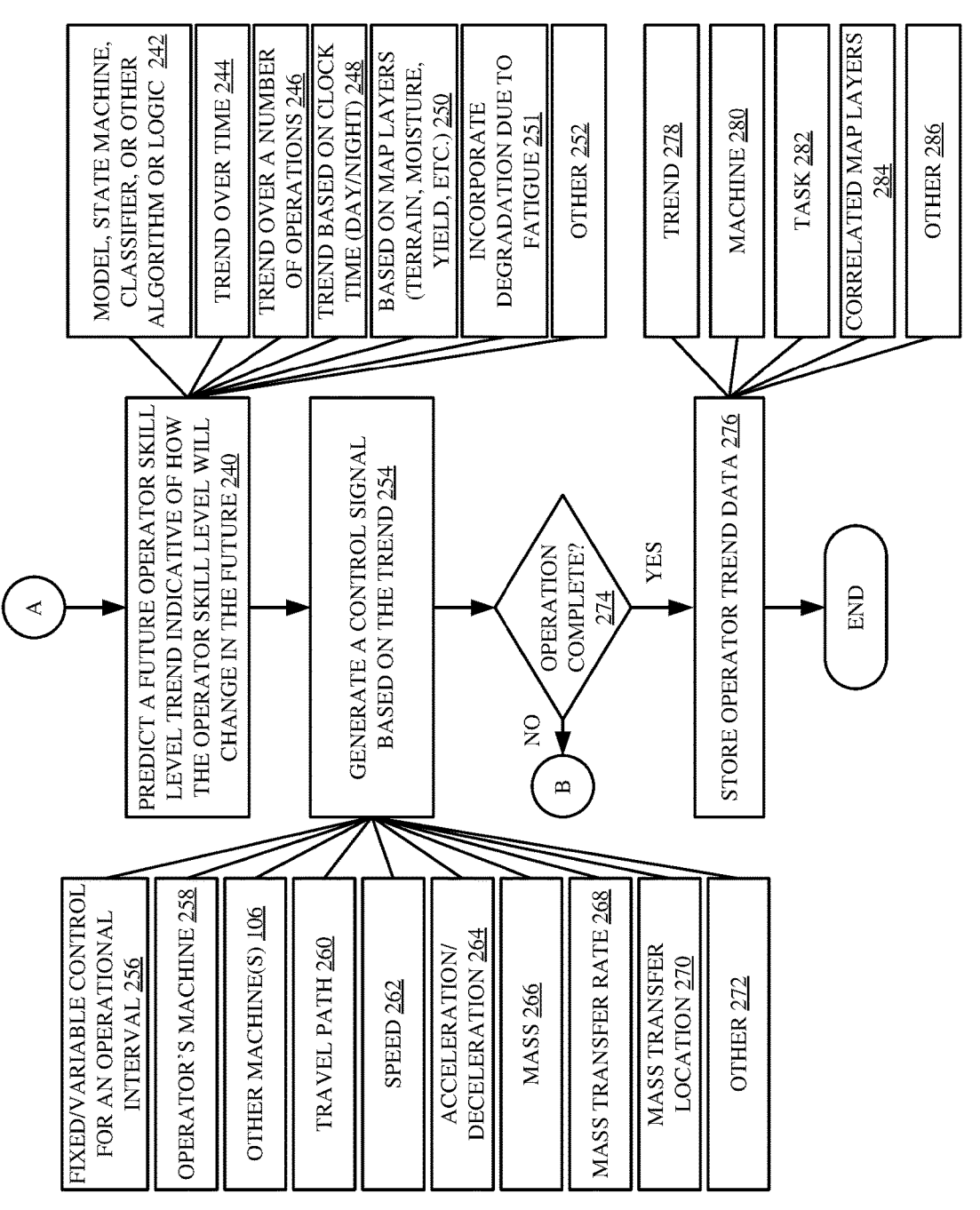

FIGS. 2A and 2B (collectively referred to herein as FIG. 2) show a flow diagram illustrating one example of the operation of agricultural machine 102 in generating an operator skill level trend and using the operator skill level trend to control agricultural machine 102 and/or other machines 106.

Operator skill trend generation system 118 identifies operator 103 and the agricultural machine 102 and/or the task to be performed by the agricultural machine 102, as indicated by block 190 in the flow diagram of FIG. 2. For instance, operator 103 may enter, through operator interface subsystem 182, an operator input indicating and authenticating the identity of operator 103. The operator authentication input is indicated by block 192 and may include a personal identification number (PIN), biometric information (such as fingerprints, retinal scan, etc.) or other information indicative of the identity of operator 103. It will also be noted that the identity of operator 103 may not personally identify operator 103, but identify operator 103 only for purposes of the present operation to distinguished operator 103 from other operators, such as to ensure that operator 103 does not change during the operation when a shift change occurs. The identity of the operator, machine, and/or task, may be obtained from a cloud-based data store found in other systems 108, as indicated by block 194. For instance, the identity of agricultural machine 102 may be obtained from a data store in a cloud-based system which identifies agricultural machine 102, its dimensions, its controllable subsystems, etc. The operator, machine, and/or task can be identified in other ways as well, as indicated by block 196.

Data store interaction system 156 then obtains any historic operator skill data and/or operator skill trend data 128 from data store 112 for the identified operator 103 on this particular agricultural machine 102 or similar agricultural machines, and/or for performing this or a similar task. Obtaining the historic information is indicated by block 198 in the flow diagram of FIG. 2. The operator skill/trend data 128 may, as discussed above, include an initial skill level assigned to operator 103, as indicated by block 200, one or more skill level trend curves or tables or other indicators of historic skill level trends, as indicated by block 202, or other information 204.

Data store interaction system 156 then also obtains the skill-based parameters 130 (parameters indicative of operator attributes) that are to be monitored in generating the skill level trend for operator 103. Identifying the skill-based parameters 130 is indicated by block 206 in the flow diagram of FIG. 2. Such parameters can include task performance parameters 208 that are indicative of the skill level of operator 103 in performing the current task with agricultural machine 102. The skill-based parameters 130 can also include fatigue parameters 210 that can be monitored to identify the fatigue level and fatigue level trend of operator 103. Skill-based parameters 130 can include other parameters 212 as well. The task performance parameters 208 and fatigue parameters can be indicative of how operator 103 is acting and reacting in certain scenarios.

The sensors 114 then detect values indicative of the operator actions, reactions, and other parameters as indicated by block 214. Such parameters can indicate the aggressiveness with which operator 103 is operating agricultural machine 102, such as how quickly the operator 103 accelerates agricultural machine 102, and how quickly operator 103 stops agricultural machine 102, how often and aggressively operator 103 engages the clutch and/or brake of agricultural machine 102, how often and how aggressively operator 103 adjusts the travel speed, the engine speed, or the transmission settings, how often and aggressively operator 103 adjusts the heading of agricultural machine 102. The skill-based parameters 130 can also be indicative of how consistently operator 103 is operating agricultural machine 102, such as the consistency in the ground speed of agricultural machine 102, and/or the consistency in other operations. The skill-based parameters 130 can include the frequency and amount of spills of harvested material from agricultural machine 102. Detecting operator aggressiveness factors is indicated by block 216. Detecting consistency factors is indicated by block 218. Detecting other performance metrics is indicated by block 220. Detecting fatigue indicators is indicated by block 224. In addition to values for skill based parameter 130, additional context information can be obtained as well, such as map layers 126, as indicated by block 226. Operator actions, reactions, and other parameter values and context information can be detected in other ways as well, as indicated by block 228.

Sensor value signal conditioner or component 158 can receive and aggregate the detected parameter values over an operational interval as indicated by block 230. The operational interval may be a time interval, an interval of distance covered, or another interval as indicated by block 231. The operational interval may be a fixed interval 232, a dynamic interval 234, or another interval 236. After a sufficient number of parameter values are detected, operator skill level score generator component 160 generates an operator skill level score for operator 103 as indicated by block 238. The sufficient number of parameter values may be based on the type of agricultural machine 102, the operation being performed, etc.

Future skill level trend generation component 164 then generates a predicted future operator skill level trend indicative of how the operator skill level will change in the future (e.g., over a future operational interval, at geographic locations that will be encountered by agricultural machine 102 in the future, or in other ways) as indicated by block 240. Future skill level trend generation component 164 can be a model, a state machine, a classifier, or another algorithm or logic that generates the trend, as indicated by block 242. Generating the trend over a time interval is indicated by block 244. The trend can also be generated over a number of operations (such as over a number of passes, over a number of unloading operations, etc.), as indicated by block 246. The trend can be based on the time of day (such as whether it is the day time or night time hours) as indicated by block 248. The trend can be based on different locations on map layers 126 that are to be encountered by agricultural machine 102, as indicated by block 250. The operator skill level trend can incorporate degradation due to the operator's estimated fatigue level as indicated by block 251. The operator skill level trend can be generated in other ways as well, as indicated by block 252, for example, but not by limitation, lighting conditions at the field, such as the level of brightness, the angle of the sun relative to the direction of travel, as well as various other factors.

Control system 120 then generates a control signal based upon the operator skill level trend as indicated by block 254. As discussed above, the control signal can be identified by trend analyzer component 168 and generated by control signal generator 170 and applied to one of the controllable subsystems 122. The control signal can control the controllable subsystems 122 in a fixed or variable way over an operational interval such as over a time interval or over a set of geographic locations as indicated by block 256. The control signal can be generated on the agricultural machine 102 that is operated by the operator 103 for which the operator skill level trend was generated, as indicated by block 258, or for another machine 106. The control signal can be applied to one or more controllable subsystems 122 to control or limit, the travel path 260 of agricultural machine 102, the speed 262, the acceleration or deceleration (or both) 264, the mass or load 266 carried by agricultural machine 102, the mass transfer rate 268, the mass transfer location (such as where a harvester is unloaded, where a planter is refilled, etc.) as indicated by block 270, or any of a wide variety of other controllable items, as indicated by block 272 in the flow diagram of FIG. 2.

As long as agricultural machine 102 continues to perform the operation, processing reverts to block 214, as indicated by block 274. When the operation is complete, or at other times during the operation, the operator skill level trend data can be stored in data store 112 or in another system 108, as indicated by block 276. The data to be stored can be the operator skill level trend 278, the particular agricultural machine 102 that was being operated by operator 103 as indicated by block 280, or the task being performed as indicated by block 282. The operator skill level trend data can be stored, as correlated to different geographic locations on different map layers as indicated by block 284. Operator skill level trend data can include other information and it can be stored in other ways as indicated by block 286.

It can thus be seen that the present description describes a system in which an operator skill level tend is generated and an agricultural machine is controlled based upon that trend. The trend can account for degradation due to fatigue or other operational information.

The present discussion has mentioned processors and servers. In one example, the processors and servers include computer processors with associated memory and timing circuitry, not separately shown. They are functional parts of the systems or devices to which they belong and are activated by, and facilitate the functionality of, the other components or items in those systems.

Also, a number of user interface displays have been discussed. The user interfaces can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, the mechanisms can be actuated using touch gestures. Also, where the device that displays the mechanisms has speech recognition components, the mechanisms can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Figure 3:
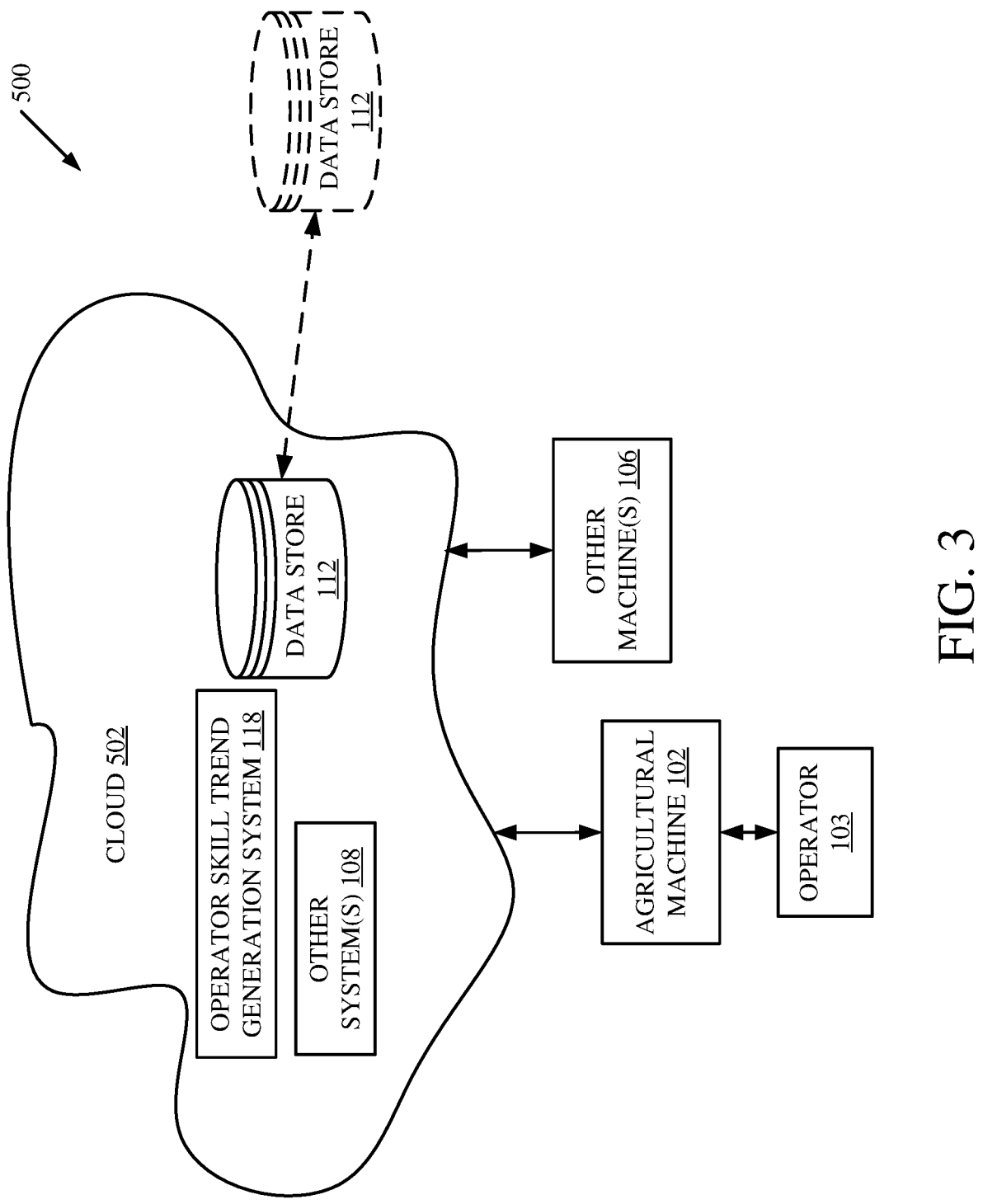
FIG. 3 is a block diagram showing one example of the agricultural system shown in FIG. 1 deployed in a remote server architecture.

FIG. 3 is a block diagram of agricultural system 100, shown in FIG. 1, except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous FIGS. as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, the components and functions can be provided from a conventional server, or the components and functions can be installed on client devices directly, or in other ways.

In the example shown in FIG. 3, some items are similar to those shown in previous FIGS. and they are similarly numbered. FIG. 3 specifically shows that operator skill trend generation system 118, data store 112, and other systems 108 can be located at a remote server location 502. Therefore, agricultural machine 102 accesses those systems through remote server location 502.

FIG. 3 also depicts another example of a remote server architecture. FIG. 3 shows that it is also contemplated that some elements of previous FIGS are disposed at remote server location 502 while others are not. By way of example, data store 112 or other items can be disposed at a location separate from location 502, and accessed through the remote server at location 502. Regardless of where the items are located, the items can be accessed directly by agricultural machine 102, through a network (either a wide area network or a local area network), the items can be hosted at a remote site by a service, or the items can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the agricultural machine 102 comes close to the fuel truck for fueling, the system automatically collects the information from the agricultural machine 102 using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the agricultural machine 102 until the agricultural machine 102 enters a covered location. The agricultural machine 102, itself, can then send the information to the main network.

It will also be noted that the elements of previous FIGS., or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 4:
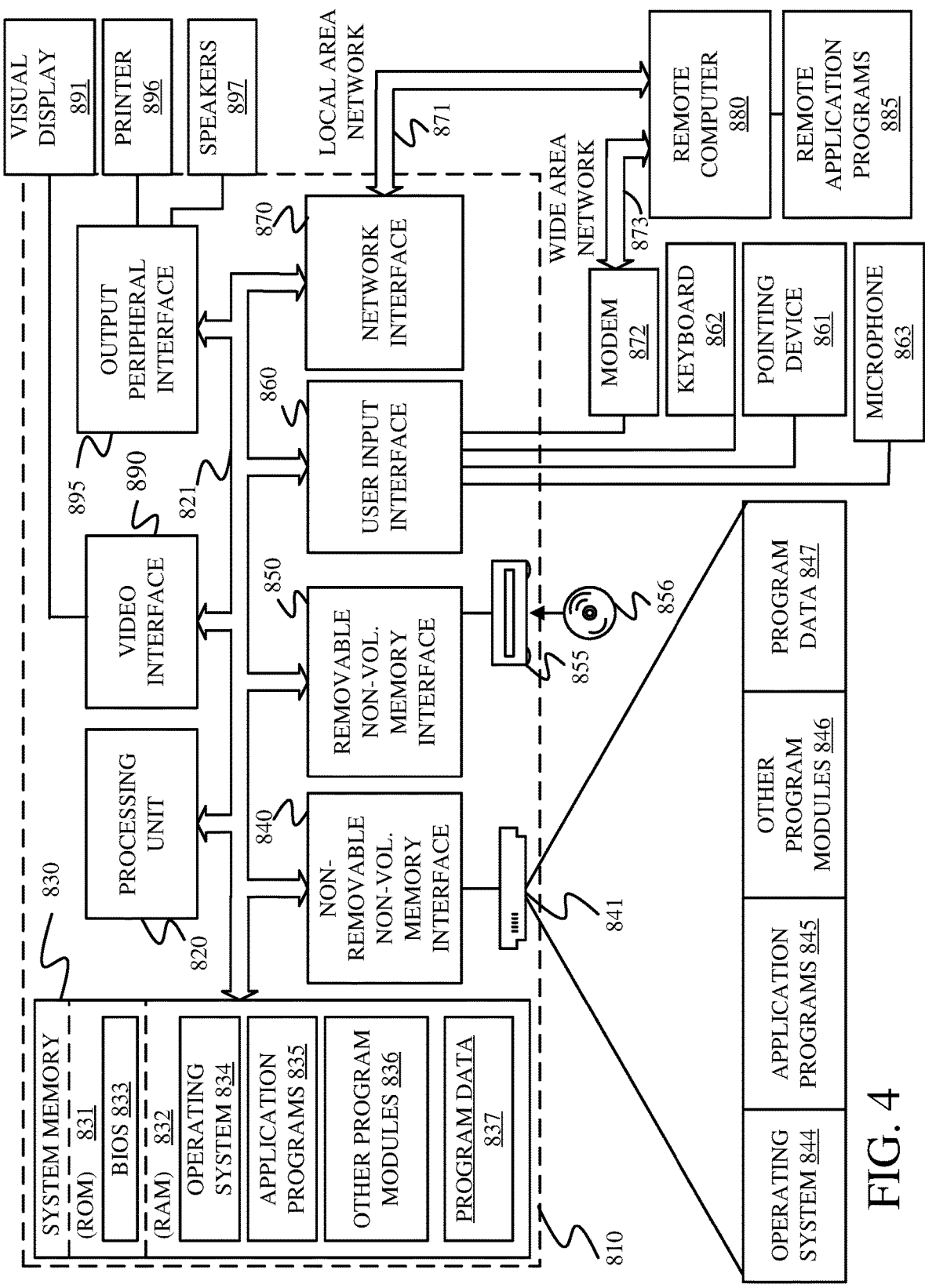
FIG. 4 is a block diagram showing one example of a computing environment.

FIG. 4 is one example of a computing environment in which elements of previous FIGS., or parts of it, (for example) can be deployed. With reference to FIG. 4, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous FIGS. can be deployed in corresponding portions of FIG. 4.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 4 illustrates operating system 834, application programs 835, other program modules 836, and program data 837.

The computer 810 may also include other removable/non-removable volatile/nonvolatile computer storage media. By way of example only, FIG. 4 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FP-GAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 4, provide storage of computer readable instructions, data structures, program modules and other data for the computer 810. In FIG. 4, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 4 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

19

What is claimed is:

1. A computer implemented method of controlling an agricultural machine, comprising:

detecting, with an in-situ sensor, one or more operator characteristics;

detecting a skill-based parameter value indicative of an operator skill level in controlling the agricultural machine to perform an agricultural operation based on the one or more operator characteristics;

obtaining one or more agricultural operation characteristics of the agricultural operation;

generating, based on the one or more agricultural operation characteristics and the skill-based parameter value, a predicted future operator skill level trend indicative of estimated variation in the operator skill level over a future portion of the agricultural operation; and generating a control signal to control a controllable subsystem of the agricultural machine based on the predicted future operator skill level trend.

2. The computer implemented method of claim 1, wherein generating an operator skill level trend comprises:

generating the predicted future operator skill level trend indicative of estimated variation in the operator skill level over at least one of:

a future time interval; or a portion of a future machine path to be taken by the agricultural machine in performing the agricultural operation.

3. The computer implemented method of claim 1, wherein generating the predicted future operator skill level trend comprises:

generating a current operator skill level;

generating an operator fatigue level; and generating the predicted future operator skill level trend based on the current operator skill level and the operator fatigue level.

4. The computer implemented method of claim 1 wherein generating a control signal comprises:

generating the control signal to control a path planning subsystem to control a path of the agricultural machine in performing the agricultural operation based on the predicted future operator skill level trend.

5. The computer implemented method of claim 4, wherein generating the control signal to control the path planning subsystem comprises:

controlling the path planning subsystem so the path directs the agricultural machine over a portion of a field having characteristics indicative of a first difficulty in performing the agricultural operation when the predicted future operator skill level trend indicates that the operator skill level will be at a first level and so the path directs the agricultural machine over a portion of the field having characteristics indicative of a second difficulty in performing the agricultural operation when the predicted future operator skill level trend indicates that the operator skill level will be at a second level.

6. The computer implemented method of claim 1, wherein generating a control signal comprises:

generating the control signal to control a propulsion subsystem to control propulsion of the agricultural machine in performing the agricultural operation based on the predicted future operator skill level trend.

7. The computer implemented method of claim 1, wherein generating a control signal comprises:

generating the control signal to control a steering subsystem to control steering of the agricultural machine in performing the agricultural operation based on the predicted future operator skill level trend.

8. The computer implemented method of claim 1, wherein generating a control signal comprises:

generating the control signal to control a material handling subsystem to control material handling of the agricultural machine based on the predicted future operator skill level trend.

9. The computer implemented method of claim 1, wherein generating a control signal comprises:

generating the control signal to control an operator interface subsystem on the agricultural machine based on the predicted future operator skill level trend.

10. The computer implemented method of claim 1 and further comprising:

sending the predicted future operator skill level trend to a control system that is used for controlling another agricultural machine; and controlling the other agricultural machine based on the predicted future operator skill level trend.

11. An agricultural system, comprising:

at least one processor; and a data store that stores computer executable instructions that, when executed by the at least one processor, cause the at least one processor to:

detect a skill-based parameter value indicative of an operator skill level in controlling a first agricultural machine to perform an agricultural operation;

obtain one or more agricultural operation characteristics of the agricultural operation;

generate, based on the one or more agricultural operation characteristics and the skill-based parameter value, a predicted future operator skill level trend indicative of estimated variation in the operator skill level over a future portion of the agricultural operation; and generate one or more control signals to control one or more controllable subsystems of the first agricultural machine based on the predicted future operator skill level trend, wherein the computer executable instructions that, when executed by the at least one processor, cause the at least one processor to generate the one or more control signals to control one or more controllable subsystems includes computer executable instructions that, when executed by the at least one processor, cause the at least one processor to generate a control signal to control a path planning subsystem to control a path of the first agricultural machine in performing the agricultural operation based on the predicted future operator skill level trend.

12. The agricultural system of claim 11, wherein the computer executable instructions, when executed by the at least one processor, further cause the at least one processor to:

send an indication of the predicted future operator skill level trend to a control system that is used for controlling a second agricultural machine; and control the second agricultural machine based on the indication of the predicted future operator skill level trend.

13. The agricultural system of claim 11, wherein the predicted future operator skill level trend is indicative of estimated variation in the operator skill level over a future time interval.

14. The agricultural system of claim 11, wherein the predicted future operator skill level trend is indicative of estimated variation in the operator skill level over a portion of a future machine path to be taken by the first agricultural machine in performing the agricultural operation.

15. The agricultural system of claim 11, wherein the computer executable instructions, when executed by the at least one processor, further cause the at least one processor to:

generate a current operator skill level based on the skill-based parameter value;

detect a fatigue parameter value indicative of operator fatigue;

generate an operator fatigue level based on the fatigue parameter value; and generate the predicted future operator skill level trend based on the current operator skill level and the operator fatigue level.

16. An agricultural machine comprising:

a controllable subsystem;

one or more sensors detecting a plurality of operator characteristics;

one or more processors; and memory storing instructions executable by the one or more processors that, when executed by the one or more processors, configure the one or more processors to:

determine one or more skill-based parameter values indicative of an operator skill level in controlling the agricultural machine to perform an agricultural operation based on the detected plurality of operator characteristics;

generate a predicted future operator skill level trend indicative of estimated variation in the operator skill level over a future portion of the agricultural operation based on the one or more skill-based parameter values;

generate a control signal to control the controllable subsystem of the agricultural machine based on the predicted future operator skill level trend.

17. The agricultural machine of claim 16 and further comprising:

a communication system configured to send an indication of the predicted future operator skill level trend to a control system used for controlling a second agricultural machine.

18. The agricultural machine of claim 16, wherein the predicted future operator skill level trend is indicative of estimated variation in the operator skill level over a future time interval.

19. The agricultural machine of claim 16, wherein the predicted future operator skill level trend is indicative of estimated variation in the operator skill level over a portion of a future machine path to be taken by the agricultural machine in performing the agricultural operation.

20. The computer implemented method of claim 1, wherein the one or more agricultural operation characteristics comprise at least one of:

a temporal condition of at least a portion of the agricultural operation;

a lighting condition;

a field condition; or a crop condition.

\* \* \* \* \*